United States Patent
Lu et al.

(10) Patent No.: US 7,971,067 B2
(45) Date of Patent: Jun. 28, 2011

(54) METHOD AND SYSTEM FOR CONTROLLING THE SMART ELECTRIC APPLIANCE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 795 days.

(21) Appl. No.: 11/963,900

(22) Filed: Dec. 24, 2007

(65) Prior Publication Data

US 2008/0201764 A1 Aug. 21, 2008

(30) Foreign Application Priority Data

Feb. 15, 2007 (CN) .......................... 2007 1 0063976

(51) Int. Cl.
*G06F 21/00* (2006.01)
(52) U.S. Cl. ....................................... 713/185; 713/182
(58) Field of Classification Search ................ 726/2, 16, 726/17, 20, 34; 713/182, 185; 725/25; 705/55, 705/50, 56
See application file for complete search history.

(56) References Cited

U.S. PATENT DOCUMENTS

| | | | |
|---|---|---|---|
| 6,216,230 B1 * | 4/2001 | Rallis et al. | 713/185 |
| 2004/0177072 A1 | 9/2004 | Salminen | |
| 2007/0067793 A1 * | 3/2007 | Ng et al. | 725/25 |
| 2009/0019468 A1 * | 1/2009 | Ganesan et al. | 725/25 |

* cited by examiner

*Primary Examiner* — Hosuk Song
*Assistant Examiner* — Edward Zee
(74) *Attorney, Agent, or Firm* — Hammer & Associates, P.C.

(57) ABSTRACT

The present invention discloses a method for controlling the smart electric appliance by connecting a key device to a smart electric appliance and performing control operations on the smart electric appliance in accordance with the control settings for the key device after positively authenticating the internal device descriptor of the key device. Also, the present invention discloses a system according to the method mentioned above, including a smart electric appliance comprising a USB interface module, an authentication module, an execution module and a general control module, and a key device comprising a smart storage module. By introducing the key device, authenticating the key device before allowance of use of the smart electric appliance, and setting different control operation levels for different users of the smart electric appliance, it becomes very secure to use the smart electric appliance, while it becomes more flexible to use the same.

10 Claims, 3 Drawing Sheets

METHOD AND SYSTEM FOR CONTROLLING THE SMART ELECTRIC APPLIANCE

FIELD OF THE INVENTION

The present invention relates to a method and a system for controlling a smart electric appliance, and more particularly, to a method for controlling the smart electric appliance with a key device and a system using the method.

BACKGROUND OF THE INVENTION

The progress of technologies boosts the development of the industry of home electric appliance. Many electric appliances employ digital technology to realize intellectualized control such that the traditional electric appliance is added a controller chip, which executes relevant programs to perform functions of the appliance. The extended electric appliance is also referred to as "the smart electric appliance". As a popular interface technology, USB (Universal Serial Bus) interface is added to the smart electric appliance by manufacturers to communicate between the smart electric appliance and USB ready external devices. For example, the USB port on digital TV can be used to connect USB disks or removable hard disks to view pictures or play audio or video contents.

The requirements of features and security for the electric appliance also increase. For example, the owner of an electric appliance may want to control who can use or how one can use the electric appliance, i.e. to control the rights to use the appliance. In particular, parents may want to restrict the TV programs deemed not suitable for their children to watch, the period of time that the TV can be used by their children, or the channels that are allowed or disallowed to be watched by their children.

The key device is a two-factor security authentication device with a USB interface in information security sector. It is an easy-to-use and low-cost security solution. With built-in SCM or smart card chip, it can store user's keys or digital certificates. The cryptographic algorithms reside on the key device for authenticating the user. The key device provides many security features, such as email encryption, digital signature, secure certificates, secure website logon, and access to SSL secured websites. It is impossible for a user's private key to be transferred from the key device. Also, the key device integrates with physical anti-attack protection. If the key device is used for the access control of the smart electric appliance, a low-cost solution to the security problems of use of the smart electric appliance is formed by taking advantage of an existing technology, while fully modifying the architecture of the smart electric appliance is avoided.

Some abbreviations are used in description of the present invention. The term "VID" refers to "Vendor ID", which is an identifier of the manufacturer who produces the key device. The term "PID" refers to "Product ID, which is a product serial number identifier of a product (the key device).

SUMMARY OF THE INVENTION

To solve the security problems of use of the smart electric appliance, the present invention provides a method for controlling the smart electric appliance using a key device and a system for controlling the same.

The method for controlling the smart electric appliance using a key device includes the steps of:
1) connecting a key device to a smart electric appliance;
2) authenticating the key device with an internal device descriptor by the smart electric appliance;
3) performing control operations, by the smart electric appliance, in accordance with the internal device descriptor of the key device, in response to positively authenticating; or prompting an error message in response to negatively authenticating.

Preferably, the smart electric appliance corresponds to a plurality of key devices.

Preferably, the internal device descriptor of the key device includes, but not limited to, the VID, the PID, the hardware serial number and the control operators of the key device, or other information entered with a keyboard connected to the key device.

Preferably, the internal device descriptor of the key device is updated or modified as required.

Preferably, the authenticating is to verify the legitimacy of the key device using the combination of the VID, the PID and the hardware serial number on the key device.

Preferably, the control operations are performed on the smart electric appliance with the control operators on the key device, which include control over access, duration of use, and payment for use.

Preferably, the access includes control over switching the smart electric appliance on or off and use of a specific function of the smart electric appliance.

In another aspect, the present invention provides a system for controlling the smart electric appliance including a smart electric appliance which further includes a USB interface module for receiving and reading an internal device descriptor from the key device, an authentication module for authenticating the key device for legitimacy in response to the received device descriptor, a general control module for controlling information interaction between parts of the smart electric appliance, and an execution module for conducting functions of the smart electric appliance under internal device descriptor-based control of the general control module, and a key device which further includes a smart storage module for storing an internal device descriptor of the key device.

If the smart electric appliance has been connected with the key device, the smart storage module sends an internal device descriptor of the key device to the USB interface module. Then, the USB interface module sends the received internal device descriptor to the authentication module through the general control module, to verify the VID, the PID, and the hardware serial number contained in the descriptor and return result.

Preferably, the authentication module stores internal device descriptors of a plurality of key devices, which are updated or modified as required.

After positively authenticating, the general control module obtains the device descriptor of the key device and controls the execution module in accordance with control operators contained in the descriptor.

Compared with the prior art, the present invention has the following advantages, in which
1) by introducing the key device, the smart electric appliance first authenticates the key device before allowance of use, which ensures security of use of the smart electric appliance;
2) different control operation levels can be set for users to control privileges in operating the smart electric appliance; and
3) the changeable control operators stored in the internal data memory of the smart electric appliance make the use of the smart electric appliance more flexible.

BRIEF DESCRIPTION OF THE DRAWINGS

The present invention may be further understood from the following description in conjunction with the appended drawings, in which.

DETAILED DESCRIPTION OF THE PREFERRED EMBODIMENTS

The present invention is further described with the embodiments and the drawings below.

Figure 1:
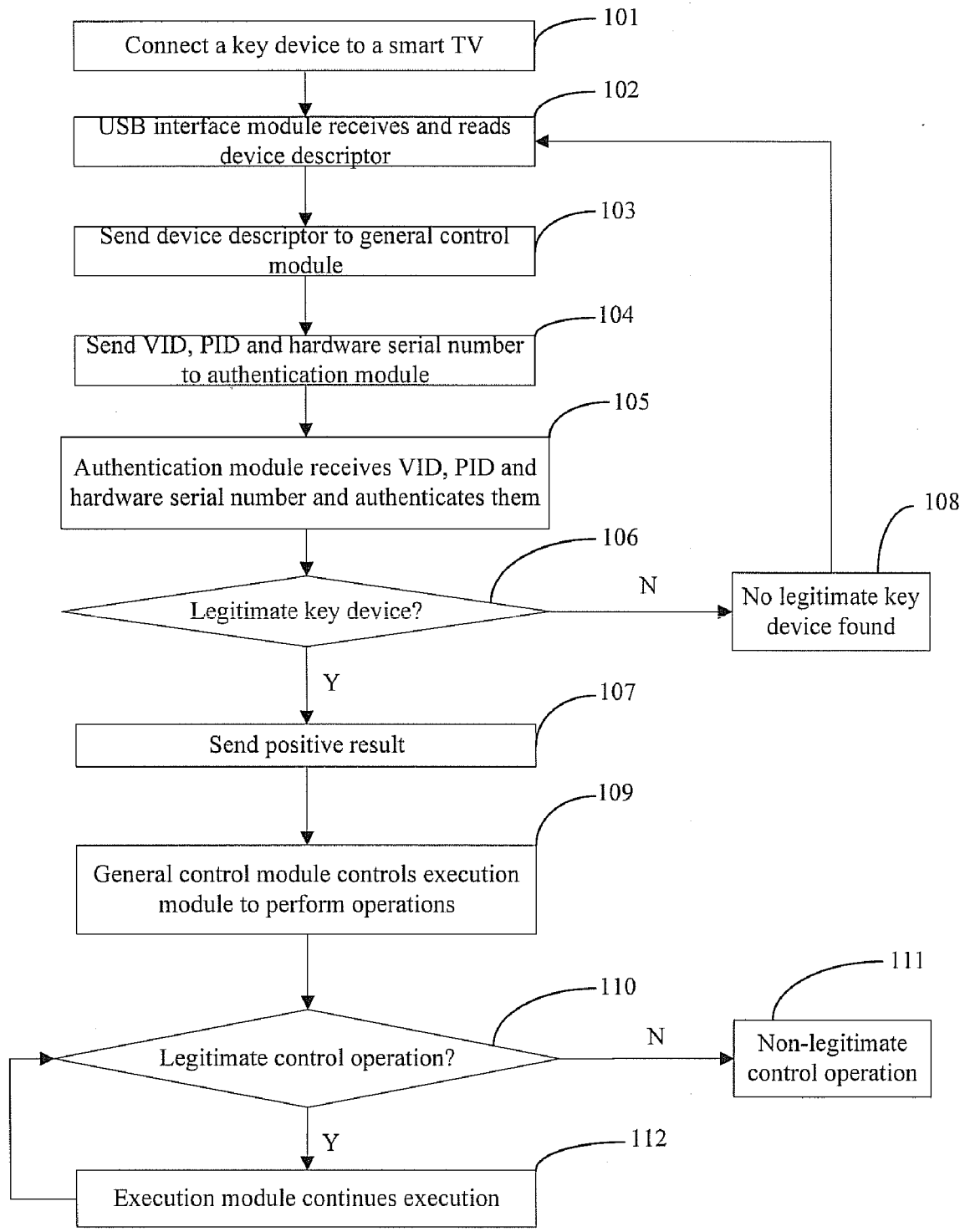
FIG. 1 is a flow diagram of controlling a smart TV with a key device.

Referring to FIG. 1, the key device is used to control the smart TV to play specific programs, such as a program for kids, in certain time. The process is carried out with the following steps, in which:

Step 101: Connect the key device to the smart TV;

Step 102: The USB interface module of the smart TV receives and reads the device descriptor from the key device;

Step 103: The USB interface module sends the received device descriptor to the general control module of the smart TV;

Step 104: The general control module sends the VID, the PID and the hardware serial number contained in the received device descriptor to the authentication module of the smart TV;

Step 105: After receiving the VID, the PID and the hardware serial number, the authentication module authenticates them (up to 3 times for this embodiment);

Step 106: Determine whether the key device is legitimate; if it is legitimate, go to the next step; otherwise go to step 108;

Step 107: The authentication module informs the general control module of the positive result;

Step 108: Prompt that no legitimate key device is found, and return to step 102;

Step 109: After receiving the positive result, the general control module controls the execution module of the smart TV to perform relevant operations in accordance with control operators in the device descriptor (control operations include turning on, locking a channel for kids and allowing the smart TV to work for only an hour for this embodiment);

Step 110: The general control module monitors the execution of the execution module in real-time; if one of control operations is not met (for example, a program from a channel other than the channel previously locked is attempted, or the smart TV has been working for more than an hour), go to the next step; otherwise go to step 112;

Step 111: The execution module stops working as the control operation is not allowed;

Step 112: The execution module continues to perform relevant operations and the step 110 is repeated until all control operations have been performed in a legitimate manner.

Figure 2:
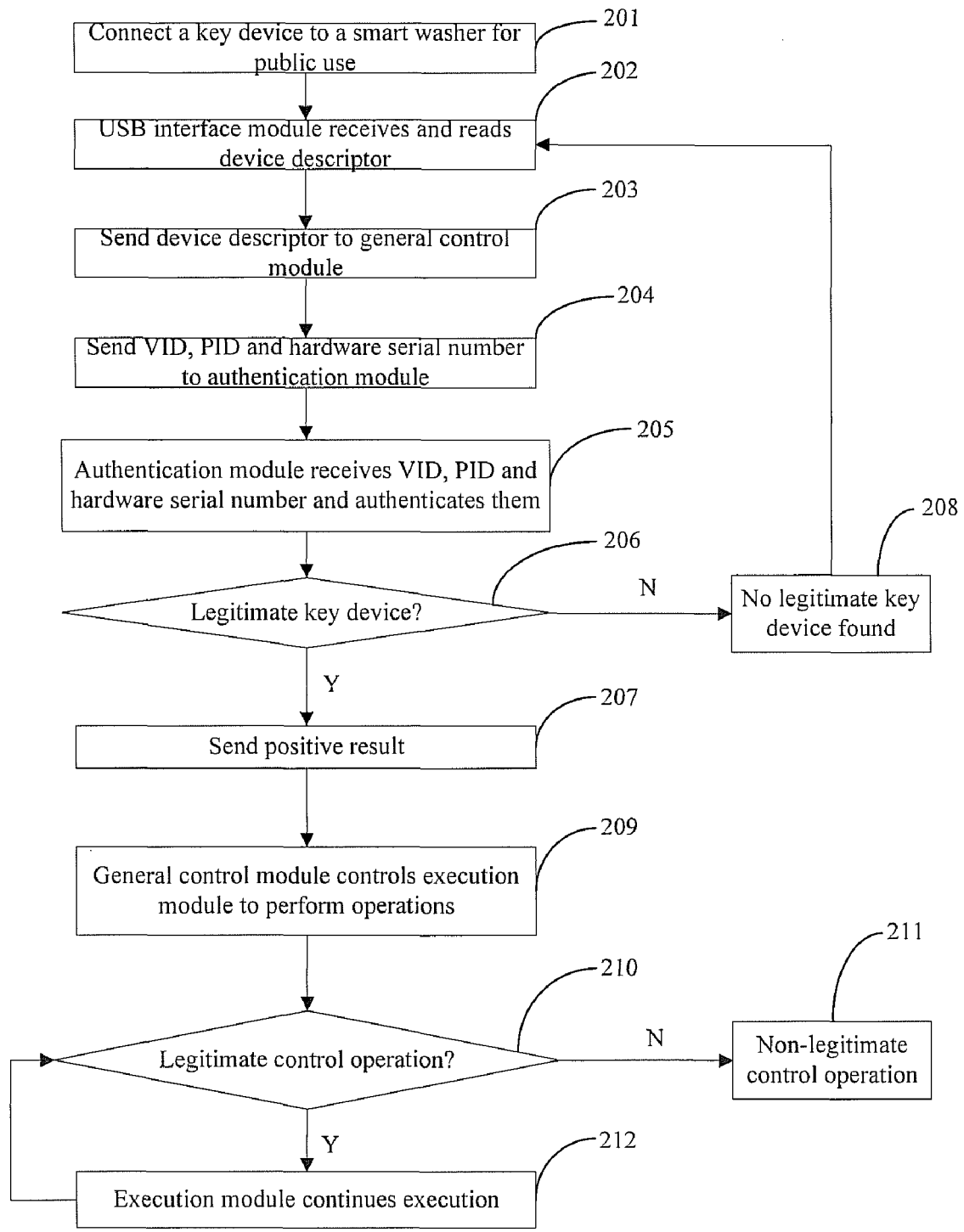
FIG. 2 is a flow diagram of controlling a smart washer with a key device.

Referring to FIG. 2, the key device is used to control the smart washer for public use. The process is carried out with the following steps, in which Step 201: Connect the key device to the smart washer;

Step 202: The USB interface module of the smart washer receives and reads the device descriptor from the key device;

Step 203: The USB interface module sends the received device descriptor to the general control module of the smart washer;

Step 204: The general control module sends the VID, the PID and the hardware serial number contained in the received device descriptor to the authentication module of the smart washer;

Step 205: After receiving the VID, the PID and the hardware serial number, the authentication module authenticates them (up to 3 times for this embodiment);

Step 206: Determine whether the key device is legitimate; if it is legitimate, go to the next step; otherwise go to step 208;

Step 207: The authentication module informs the general control module of the positive result;

Step 208: Prompt that no legitimate key device is found, and return to step 202;

Step 209: After receiving the positive result, the general control module controls the execution module of the smart washer to perform relevant operations in accordance with control operators in the device descriptor (control operations include querying account balance, deducting amount of payment for use for this embodiment);

Step 210: The general control module monitors the execution of the execution module in real-time; if one of control operations is not met, go to the next step; otherwise go to step 212;

Step 211: The execution module stops working as the control operation is not allowed (for example, the balance is not sufficient to pay for use for this embodiment);

Step 212: The execution module continues to perform relevant operations and the step 210 is repeated until all control operations have been performed in a legitimate manner.

Figure 3:
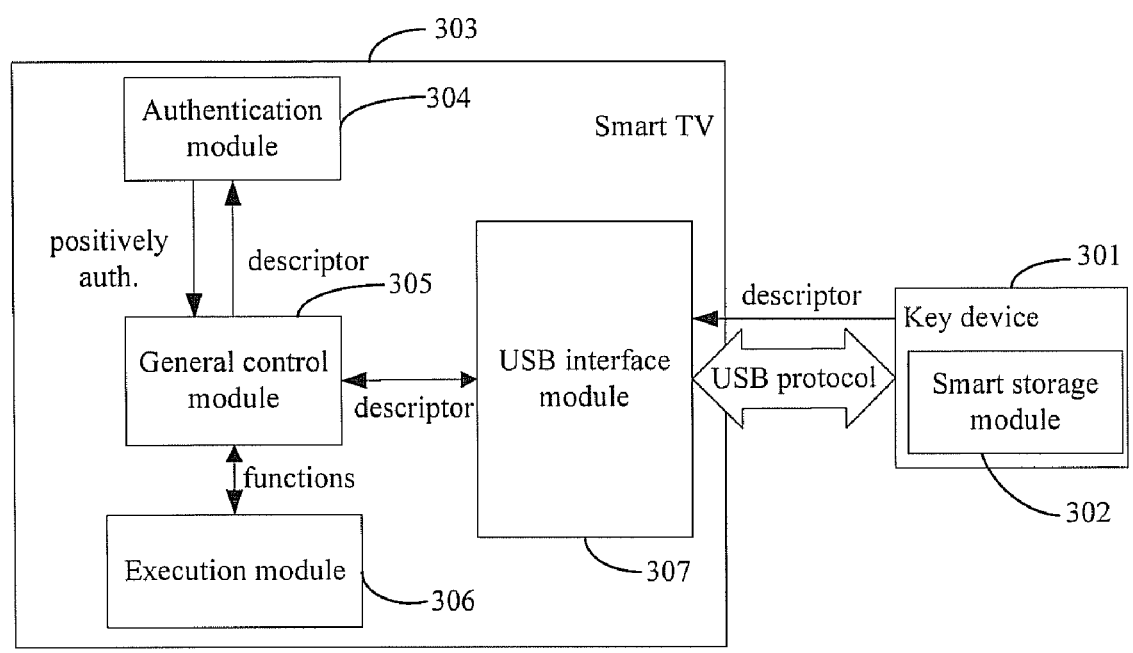
FIG. 3 is a block diagram of the system of the present invention.

Referring to FIG. 3, this is a block diagram of the system of the present invention, taking the smart TV as an example part. The system includes a smart TV 303 and a key device 301.

Further, the smart TV 303 includes an authentication module 304, a general control module 305, an execution module 306, and a USB interface module 307; the key device 301 includes a smart storage module 302.

The USB interface module 307 is coupled to the general control module 305 for receiving and reading the device descriptor of the key device 301, and for sending the device descriptor to the general control module 305.

The authentication module 304 is also coupled to the general control module 305 for verifying the VID, the PID or the hardware serial number sent from the general control module 305 against that stored in it to determine if they are identical.

The general control module 305 is coupled to the authentication module 304, the USB interface module 307 and the execution module 306, respectively. It stores necessary applications for controlling operation of other modules and allowing for communication between the modules.

The execution module 306 is coupled to the general control module 305 for conducting functions of the smart electric appliance (the smart TV for this embodiment) under control of the general control module 305.

The smart storage module 302 in the key device 301 could be connected to the USB interface module 307 in the smart TV 303 via the USB protocol for storing the device descriptor of the key device 301 and providing it to the USB interface module 307.

For this embodiment, the device descriptor of the smart TV includes the VID, the PID, the hardware serial number and the control operators. In addition, the descriptor may also include other information input from a keyboard connected with the key device.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A method for controlling a smart electric appliance comprising the steps of:
   1) connecting a key device to the smart electric appliance, the key device having an internal device descriptor including a vendor ID (VID) which is an identifier of the manufacturer who produces the key device, a product ID (PID) which is a product serial number identifier of the key device, a hardware serial number of the key device, and control operators of the key device which include controlling access, duration of use, and payment for use;
   2) authenticating the key device for legitimacy using the VID, the PID, and the hardware serial number; and
   3) performing control operations by the smart electric appliance in accordance with the control operators of the key device, in response to the authenticating returning a positive result; or prompting an error message in response to the authenticating returning a negative result.

2. The method for controlling the smart electric appliance according to claim 1, wherein the smart electric appliance corresponds to a plurality of key devices.

3. The method for controlling the smart electric appliance according to claim 1, wherein the internal device descriptor of the key device comprises other information entered with a keyboard connected to the key device.

4. The method for controlling the smart electric appliance according to claim 1, wherein the internal device descriptor of the key device is updated or modified.

5. The method for controlling the smart electric appliance according to claim 1, wherein the access includes control over switching the smart electric appliance on or off and use of a specific function of the smart electric appliance.

6. A system for controlling a smart electric appliance, the system including the smart electric appliance and a key device, characterized by:
   the smart electric appliance comprising:
      a USB interface module configured to detect whether the key device is connected to the smart electric appliance, and further configured to receive and read an internal device descriptor from the key device, the internal device descriptor including a vendor ID (VID) which is an identifier of the manufacturer who produces the key device, a product ID (PID) which is a product serial number identifier of the key device, a hardware serial number of the key device, and control operators of the key device which include controlling access, duration of use, and payment for use;
      an authentication module configured to authenticate the key device for legitimacy using the VID, the PID, and the hardware serial number;
      an execution module configured to conduct functions of the smart electric appliance; and
      a general control module configured to control interaction between parts of the smart electric appliance, and further configured to obtain the internal device descriptor and control the execution module in accordance with the control operators after the authentication module returns a positive result; and
   the key device comprising:
      a smart storage module configured to store the internal device descriptor.

7. The system for controlling the smart electric appliance according to claim 6, wherein if the smart electric appliance is connected to the key device, the smart storage module sends the internal device descriptor to the USB interface module.

8. The system for controlling the smart electric appliance according to claim 6, wherein the USB interface module sends the received internal device descriptor to the authentication module through the general control module, to verify the VID, the PID, and the hardware serial number contained in the internal device descriptor and return a result.

9. The system for controlling the smart electric appliance according to claim 8, wherein the authentication module stores internal device descriptors of a plurality of key devices, which are updated or modified.

10. The system for controlling the smart electric appliance according to claim 6, wherein the authentication module stores internal device descriptors of a plurality of key devices, which are updated or modified.

* * * * *